United States Patent [19]

Hellestam

[11] 4,294,705
[45] Oct. 13, 1981

[54] METHOD AND AN AGENT FOR CHEMICAL PURIFICATION OF WATER BY MEANS OF CHEMICAL PRECIPITATION AND MAGNETIC SLUDGE SEPARATION

[75] Inventor: Carl-Johan S. Hellestam, Helsingborg, Sweden

[73] Assignee: Boliden Aktiebolag, Stockholm, Sweden

[21] Appl. No.: 117,492
[22] PCT Filed: Oct. 23, 1978
[86] PCT No.: PCT/SE78/00063
§ 371 Date: Jun. 25, 1979
§ 102(e) Date: May 31, 1979
[87] PCT Pub. No.: WO79/00230
PCT Pub. Date: May 3, 1979

[51] Int. Cl.³ .............................................. B01D 35/06
[52] U.S. Cl. .................... 210/695; 210/716; 210/723
[58] Field of Search ............. 210/42 P, 42 S, 222, 210/51, 52, 73 W; 252/175, 625

[56] References Cited
U.S. PATENT DOCUMENTS

| | | | |
|---|---|---|---|
| 3,567,026 | 3/1971 | Kolm | 210/222 |
| 3,697,420 | 10/1972 | Blaisdell | 210/42 S |
| 3,912,634 | 10/1975 | Howell | 210/222 |
| 3,983,033 | 9/1976 | de Latour | 210/42 S |
| 4,089,779 | 5/1978 | Neal | 210/42 S |
| 4,108,767 | 8/1978 | Cooper | 210/42 S |
| 4,193,866 | 3/1980 | Slusglczuk et al. | 210/42 S |

FOREIGN PATENT DOCUMENTS 2551030 of 1976 Fed. Rep. of Germany .
318529 of 1969 Sweden .
321649 of 1970 Sweden .

OTHER PUBLICATIONS

Chemical Abstracts, 61: 15837e.
Chemical Abstracts, 73: 38992v.
Teknisk Tidskrift, 106 (1976):9, (1 page) "Magnetisk rening sjöar och vattendrag fran", flottar.

Primary Examiner—Theodore A. Granger
Attorney, Agent, or Firm—Stevens, Davis, Miller & Mosher

[57] ABSTRACT

A method and an agent for chemical purification of water is provided, especially waste water with subsequent magnetic sludge separation. A precipitation agent comprising as component aluminium sulphate and/or iron sulphate is used together with a magnetic material for the purification. In order to provide uniform distribution of the magnetic material in the agent composition it is added to the aluminum and/or iron sulphate component of the composition when said component is in the form of a melt or solution prior to crystallization of said composition.

1 Claim, 1 Drawing Figure

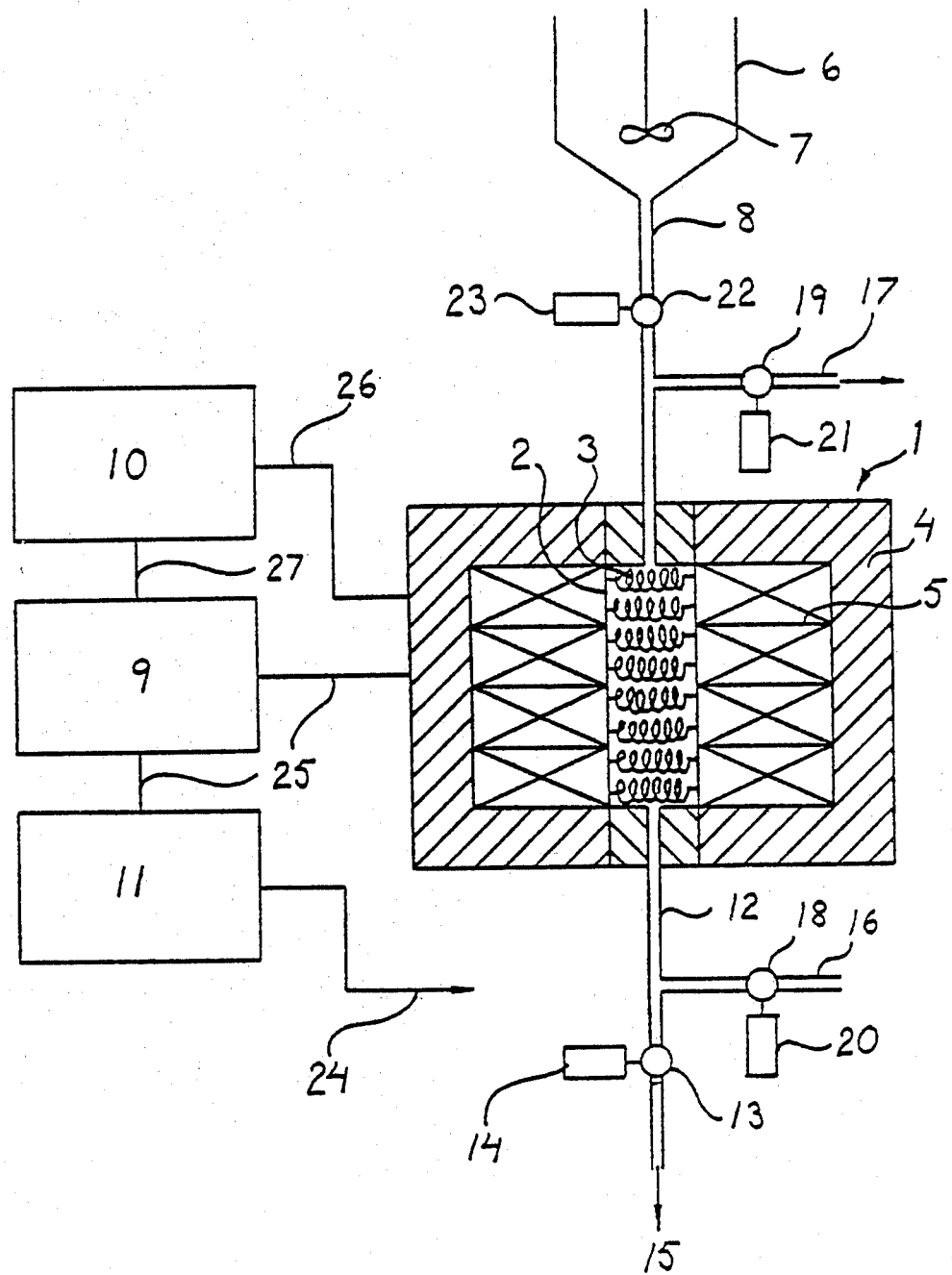

METHOD AND AN AGENT FOR CHEMICAL PURIFICATION OF WATER BY MEANS OF CHEMICAL PRECIPITATION AND MAGNETIC SLUDGE SEPARATION

The present invention relates to a method and an agent for chemical purification of water, especially wastewater with subsequent magnetic sludge separation. A precipitation agent or precipitant based on aluminium sulphate or iron sulphate is used together with a magnetic material for the purification.

In chemical purification of wastewater, a chemical is added to the water which is precipitated in the wastewater in the form of flocculated chemical compounds. The primary task of the added chemical is to precipitate the phosphates dissolved in the wastewater, which would otherwise result in fertilization of the receiving body of water. Furthermore, metals present in the water are precipitated to a large extent. The flocs have the ability of thereby effectively binding any substances suspended in the wastewater. By this treatment there is thus obtained a clear water, to a large extent liberated from suspended substances, bacteria, viruses, metals and phosphates. The content of oxygen-consuming organic substance falls considerably in this treatment.

The sludge formed in the process sketched above, and containing the impurities, is separated in conventional wastewater treatment plants by sedimentation or flotation. These operations are relatively voluminous since they cannot be carried out at high surface load. Sedimentation is generally carried out at a surface load as low as about 1 $m^3/m^2 \times h$ and flotation at a maximum surface load of about 5–10 $m^3/m^2 \times h$.

As an alternative to this conventional sedimentation or flotation, magnetic separation has been brought in, which enables the removal of particles down to colloidal size from many types of wastewater. The basic technique was originally developed at the end of the sixties in connection with the solution to the problem of removing very fine paramagnetic discolouring particles from kaolin clays used in the production of paper. It was quickly appreciated that the new technique was not limited solely to the treatment of kaolin clays, and could also be used for treating wastewater. It was then found that with the technique of magnetic sludge separation the surface load could be increased substantially also, right up to about 50–200 $m^3/m^2 \times h$. This has the advantage that magnetic sludge separation requires less space than conventional sludge separation. To obtain an approximate idea of the differences, a plant for magnetic sludge separation can be compared to a plant having the same capacity for sedimentation, the former requiring at most 1/10 as great a space as the latter.

Attempts have been made to utilize conventional flocculation agents in combination with magnetic material for purifying wastewater in a more effective and less voluminous way. Mechanical blending of, for example, aluminium sulphate and magnetic material has been used for this purpose, but it has been found difficult to provide even distribution of the magnetic material in the flocs formed. Such even distribution of the magnetic material is necessary for the sludge separation to be carried out in an effective manner.

According to the invention it has now been surprisingly found that if a composition is used as precipitant, this composition being obtained by adding the magnetic material to the flocculation chemicals of the precipitant when it is in the form of a melt or solution, very uniform distribution of the magnetic material in conjunction with flocculation can be obtained, and thereby a more effective separation of the flocs formed as well. The precipitants of interest in conjunction with the invention are aluminium sulphate and/or iron (II) sulphate. A preferred flocculant is aluminium sulphate which, when it is present as a melt, easily allows itself to be blended with the magnetic material, whereby the crystallisation of the melt under stirring leads to the formation of a composition based on aluminium sulphate in which the magnetic material is very evenly distributed. Iron (II) sulphate is also amenable to be transferred into a melt or solution, but in this case some water must be added for maintaining the right water content, to compensate for the water which is driven off by vaporization in connection with melting the iron sulphate.

By "magnetic materials" are meant here and in the following such materials which are attracted by magnets, i.e. materials that can be separated with the help of magnetic fields. Magnetic materials thus comprise ferromagnetic materials, which are attracted already by relatively weak magnets, and paramagnetic materials which can be attracted by stronger magnets, e.g. of the high-gradient type which can achieve a magnetic flux density of about 2 tesla (20,000 gauss) and above, or such superconductive types with a maximum magnetic flux density of 10–15 tesla. Included in the ferromagnetic materials are iron, nickel and cobalt, as well as certain alloys and oxides of these substances. Such magnetic materials based on iron are, of course, to be preferred due to their easy availability and low price. The use of iron oxides is especially preferred. The magnetic material used in the present invention thus expediently consists of magnetite or other magnetic iron oxide, such as the iron oxide obtained in magnetite-yielding roasting of pyrites or other materials containing iron sulphide.

Seen in percent by weight, the magnetic material preferably constitutes the minor portion of the composition, e.g. 1–15 percent by weight, suitably 2–30 percent by weight and especially 3–10 percent by weight of the composition.

The invention thus relates to a process for chemical purification of water with subsequent magnetic sludge separation, and to an agent for carrying out this method. Remaining characterizing features of the invention are apparent from the patent claims. The invention will now be described in detail by means of non-restricting examples in conjunction with the appended drawing, which diagrammatically shows a system for magnetic separation used in the development of the technique according to the present invention.

The apparatus shown diagrammatically on the attached drawing is based on a Sala-HGMS magnetic separator (from Sala International, Sala, Sweden). The central portion of the plant consists of a magnetic generally denoted by the numeral 1, provided with a matrix-containing through-flow tube 2 having a diameter of about 10 cm and a length of about 15 cm. In the present experiments, a matrix 3 of expanded metal was used, i.e. a metal given a wire-netting-like appearance, which was packed completely randomly. The magnet was otherwise conventionally provided with an iron core 4 and a magnet winding 5.

Vertically above the matrix 3 there is arranged a flocculation vessel 6 provided with a propeller stirrer 7 and interior baffles, not shown. This flocculation vessel 6 is connected to the matrix 3 by means of a pipe 8. In the embodiment in question, the flocculation vessel 6 has a volume of about 20 liters while the pipe 8 has a bore of about 10 mm.

Associated with the magnetic separator there is a current supply unit 9, a heat exchanger 10 for cooling water, and a control panel 11 for regulating valves etc. The current supply is adjustable in eight steps, and the magnetic flux density achieved is in the range 0–2.0 T (tesla). The water flow through the apparatus is regulated by a throttle valve 13 in the outlet pipe 12 downstream of the magnet. The valve 13 is controlled by the control panel 11 through regulator 14. Purified water leaves the apparatus as indicated by arrow 15. The load is given in meters per hour (m/h) calculated on the cross sectional area of the through-flow tube. Side pipes 16, 17 with associated shut-off valves 18, 19 controlled by the control panel 11 through regulators 20, 21 are arranged for counter flushing, to clean the matrix. Water is lead to pipe 16 as indicated by arrow and out from pipe 17 as indicated by arrow. When performing counter flushing the pipes 8, 12 are shut off by shut-off valves 13, 22 associated with regulators 14, 23. The regulators 14, 20, 21 and 23 are controlled via conduits from control panel 11 as indicated at 24. The current supply to magnet 1 and control panel 11 is taken from current supply unit 9 as indicated by conduits 25. The heat exchanger 10 cools outgoing cooling water from the magnet 1 as indicated by conduit 26 and may also influence the power supply as indicated by connection 27.

So-called "beaker experiments" were carried out using 1-liter glass beakers provided with gate stirrers with the object of finding out whether addition of magnetic material has any disturbing effect on the flocculation. The flocculation chemicals were added as a 10 percent by weight solution during a quick admixture of 5–10 seconds, whereafter stirring was reduced to a peripheral speed of the stirrer of about 0.1 m/sec., for a flocculation period of 10 minutes. After 10 minutes sedimentation, 100 ml samples were decanted for analysis with respect to turbidity (JTU; Jackson Turbidity Units) and total phosphorus ($P_{tot}$) in mg/l.

The experiments in the magnetic separation apparatus described above were carried out in batches in such a way that the whole system was filled with drinking water up to the bottom of the flocculation vessel 6. All valves were subsequently closed and 5 liters of wastewater was transferred to the flocculation vessel. Dosing of the chemicals was carried out with a 10 percent by weight solution during a rapid admixture for 10 seconds. Stirring was thereafter reduced to the lowest possible, i.e. about 30 revolutions per minute for 5 minutes for flocculation. The water is thereafter allowed to pass through the magnetic separator under gravity, and samples for analysis were taken out after 3 liters of water had passed through the magnetic separator. The experiments were carried out at varying loads and with varying magnetic flux density. In the perculation tube, the load was thus varied between 62 and 470 meters per hour and the magnetic flux density between 0.07 and 1.60 T. It was found that the purification effect deteriorated with increased load or falling flux density. The values selected for the experiments represent suitable experimental conditions in the apparatus used. After each experiment, the current supply was cut off and the matrix was flushed clean by means of the counter flushing arrangement. Samples taken were analyzed for turbidity and total phosphorus.

Some of the experimental results are given in the tables 1–3 below. The flocculation chemicals used in the experiments are wastewater grade aluminium sulphate (AVR), to which, while in the form of a melt had been added 5 percent by weight of magnetite or 1–20 percent by weight of iron oxide (JOX). AVR is a special chemical for wastewater purification, containing active aluminium, iron and silicon compounds. Its chemical composition is as follows:

| | |
|---|---|
| Al | appr. 7% |
| Fe | appr. 3% |
| Sulphuric acid deficiency | appr. 1% |
| Water insoluble | appr. 2.5% |
| Active substance | 3.2 moles/kg |
| Aluminium is present as $Al_2(SO_4)_3 \cdot 16\text{–}17\ H_2O$ | |
| Iron is present as $Fe_2(SO_4)_3 \cdot 9\ H_2O$ | |

The water-insoluble part consists mainly of silicate mineral.

The AVR with the addition of magnetic material has been produced in the laboratory especially for these experiments. A mechanical mixture of AVR and magnetic material has been prepared, as well as a mixture consisting of magnetic material added to the final solution in connection with the normal AVR-manufacture. The AVR solution or melt, and the magnetic material are blended by stirring for 5 minutes, after which the melt is allowed to solidify while forming the solid crystalline product with the magnetic material uniformly distributed therein. The product is crushed and dissolved in water to a content of about 10 percent by weight for use as a flocculation chemical.

The magnetite used in the experiments is of laboratory quality, puriss (Kebo). The iron oxide (JOX) comes from a sulphuric acid factory and contains 65.8% $Fe_{tot}$, 0.5% being $Fe^{2+}$. For a magnetic flux density of 0.15 T the iron oxide contains 24.5% magnetic material.

Wastewater used for the experiments was collected daily from Sala Municipality Wastewater Treatment Works, which is a conventional plant working with postprecipitation and an AVR dosage of 75 g/m³.

TABLE 1

| Experiments with biologically purified wastewater | | | |
|---|---|---|---|
| Experiment | Chemical | $P_{tot}$ mg/l | Turbidity JTU |
| 1 | Untreated water | 0.59 | 9.8 |
| 2 | 75 mg/l AVR | 0.15 | 12 |
| 3 | 75 mg/l AVR + 5% magnetite | 0.18 | 12 |
| 4 | 75 mg/l AVR + 5% magnetite | 0.08 | 4.5 |
| 5 | 75 mg/l AVR + 5% magnetite | 0.20 | 8.5 |

Experiment 1 relates to assessment of the unpurified wastewater without any treatment. Experiments 2 and 3 relate to beaker experiments, experiment 2 solely using conventional flocculating agent (AVR) and experiment 3 being performed in beakers with AVR containing 5 percent by weight magnetite in a fused-in homogeneous form. Sludge separation takes place here by sedimentation. Experiment 4 relates to the use of the same flocculation agent as in Experiment 3, but carried out with magnetic separation. Finally, Experiment 5 relates to magnetic separation carried out with a solely mechanically blended composition of AVR and magnetite. During the magnetic separation a load of 62 m/h and a magnetic flux density of 0.47 T were used.

The effect of applying the technique according to the present invention is directly apparent from a comparison between the Experiments 4 and 5, where Experiment 4, according to the table, gives substantially better purification, both with regard to the figure for $P_{tot}$ and for turbidity.

TABLE 2

Further experiments carried out with varying compositions.

Load: 62 m/h   Magnetic flux density: 0.47 T

| Experiment | Chemicals | $P_{tot}$ mg/l | Turbidity JTU |
|---|---|---|---|
| 6 | Untreated water | 0.72 | 11 |
| 7 | 75 mg/l AVR, plus 5% fused-in magnetite | 0.07 | 4.2 |
| 8 | 75 mg/l AVR plus 5% fused-in ground magnetite | 0.17 | 4.0 |
| 9 | 75 mg/l AVR plus 1% fused-in JOX* | 0.32 | 18 |
| 10 | 75 mg/l AVR plus 1% fused-in ground JOX | 0.38 | 17 |
| 11 | 75 mg/l AVR plus 1% JOX, mechanical blend | 0.43 | 18 |
| 12 | 75 mg/l AVR plus 5% fused-in JOX | 0.12 | 6.1 |
| 13 | 75 mg/l AVR plus 5% fused-in ground JOX | 0.13 | 6.7 |
| 14 | 75 mg/l AVR plus 5% JOX, mechanical blend | 0.35 | 20 |
| 15 | 75 mg/l AVR plus 10% fused-in JOX | 0.20 | 8.2 |
| 16 | 75 mg/l AVR | 0.29 | 23 |

*Iron oxide

The technical effect on applying the technique according to the present invention will be seen from this table, i.e. in comparing between the examples 13 and 14, for example with fused-in and mechanically blended iron oxide. It is also apparent from the table that the use of 5 percent by weight of ferromagnetic material gives the best effect. In Experiments 8, 10 and 13 magnetic material was used which was ground for 8 minutes in a shatter box mill. This grinding operation did not appear to have any substantial effect.

TABLE 3

The effect of the time for adding magnetite in experiments with biologically purified wastewater.

Load: 62 m/h   Magnetic flux density: 0.47 T
Chemical dosage: 75 mg/l AVR + 3.75 mg/l magnetite

| Magnetite addition | $P_{tot}$ mg/l | Turbidity JTU |
|---|---|---|
| 1 minute before adding AVR | 0.15 | 12 |
| Fused-in into AVR | 0.07 | 6.5 |
| 1 minute after adding AVR | 0.16 | 13 |

The advantage with fusing-in the magnetite into the aluminium sulphate will be seen immediately from these experimental results, compared with separate addition, independent of whether the latter takes place before or after the addition of aluminium sulphate.

Tentative experiments have shown that the use of paramagnetic substances, such as oxides and hydroxides of manganese, chromium and tri-valent iron (hematite) give similar results to the above for ferromagnetic substances. However, a higher magnetic flux density and/or lower water flow rate is required when using paramagnetic substances, than for the use of ferromagnetic additives to achieve the same amount of purification.

Further experiments have shown that the grain size of the magnetic material used has an influence of great importance on the purifying result.

Thus, small grain sizes have shown to provide that no substantial sedimentation of the magnetic material occurs and that all flocs which are formed at the chemical precipitation will contain magnetic material.

The importance of the grain size is illustrated of the following results, which have been obtained when performing a chemical precipitation of biologically purified waste water and a subsequent magnetic sludge separation. The waste water had previous to the precipitation a content of total phosphorus ($P_{tot}$) of 2.3 mg/l in test run I and 1.1 mg/l in test run II, respectively. The precipitation was carried out by means of 150 mg/l AVR containing 5% by weight fused-in magnetite. The magnetic flux density of the used magnet was 0.1 T and the surface load was approximately 100 m/h. The grain size is given as the grain size median, i.e. 50% by weight of the material has smaller grain sizes than the median value.

| Magnetic material grain size μm | Phosphorus content separated mg/l | |
|---|---|---|
| | I | II |
| 2.5 | 1.30 | 0.50 |
| 8 | 0.70 | 0.35 |
| 16 | 0.60 | 0.25 |
| 30 | 0.50 | 0.25 |
| 75 | 0.40 | 0.20 |

The obtained results unequivocally exhibit that the purifying effect increases with decreasing grain size and with increasing $P_{tot}$ previous to precipitation and that the grains should be at least below 8 μm, preferably below 3 μm in size.

It has also been found possible to incorporate activated carbon into the precipitant composition while in a molten state, the carbon also being evenly distributed in the crystallized product. The advantage of having activated carbon in the product is that it has the ability of absorbing dissolved organic compounds out of the wastewater, these compounds not being usually removed in chemical purification. Since such compounds are often of a toxic nature, it will be seen that treatment of wastewater with active carbon is of great value. It has been found that a composition of the kind described hereinbefore, containing about 10 percent active carbon, apart from about 5 percent magnetite, for example, and at a dosage of 75 mg/l has the ability of removing up to 3 mg per liter dissolved organic substance, in addition to the amount removed by a composition not containing activated carbon.

I claim:

1. A method of chemically purifying water with a subsequent magnetic sludge separation comprising introducing into water a solid crystalline precipitant comprising as major components $Al_2(SO_4)_3$ and/or $FeSO_4$ together with a magnetic material, said precipitant consisting of a solid, crystalline composition having a uniform distribution of the magnetic material therein.

* * * * *